United States Patent [19]

Nagano

[11] 4,305,712
[45] Dec. 15, 1981

[54] FRONT DERAILLEUR FOR A BICYCLE INCLUDING A WIRE GUIDE EXTENSION

[75] Inventor: Masashi Nagano, Sakai, Japan

[73] Assignee: Shimano Industrial Company Limited, Osaka, Japan

[21] Appl. No.: 98,614

[22] Filed: Nov. 29, 1979

[30] Foreign Application Priority Data

Dec. 7, 1978 [JP] Japan .................. 53-168615[U]

[51] Int. Cl.³ .................. F16C 1/26; F16H 11/02
[52] U.S. Cl. .................. 474/82; 74/501 R
[58] Field of Search .................. 74/501 R; 254/389; 474/80, 81, 82

[56] References Cited

U.S. PATENT DOCUMENTS

| 3,730,012 | 5/1973 | Juy | 474/82 |
| 4,223,563 | 9/1980 | Kine | 74/501 R |
| 4,226,130 | 10/1980 | Isobe | 474/82 |

FOREIGN PATENT DOCUMENTS

| 512668 | 11/1930 | Fed. Rep. of Germany | 74/501 R |
| 2240895 | of 0000 | Fed. Rep. of Germany | |
| 943178 | 9/1948 | France | 74/501 R |
| 1118883 | of 0000 | France | |
| 1228972 | 3/1960 | France | 74/501 R |
| 1271911 | 8/1961 | France | 474/82 |
| 459399 | 1/1937 | United Kingdom | 74/501 R |
| 996462 | 6/1965 | United Kingdom | 74/501 R |

Primary Examiner—C. J. Husar
Assistant Examiner—Conrad Berman
Attorney, Agent, or Firm—Stevens, Davis, Miller & Mosher

[57] ABSTRACT

Disclosed is an improved front derailleur for a bicycle, of that type which comprises a fixing member, two linkage members and a movable member having a chain guide the derailleur being operated by a control wire to move the movable member for changing the bicycle speed. The fixing member is provided with an extension which extends therefrom downwardly of the bicycle frame and has a lowermost end positioned in the vicinity of a bottom bracket at the bicycle, the extension having at the lower end portion thereof a wire guide for guiding the control wire.

3 Claims, 2 Drawing Figures

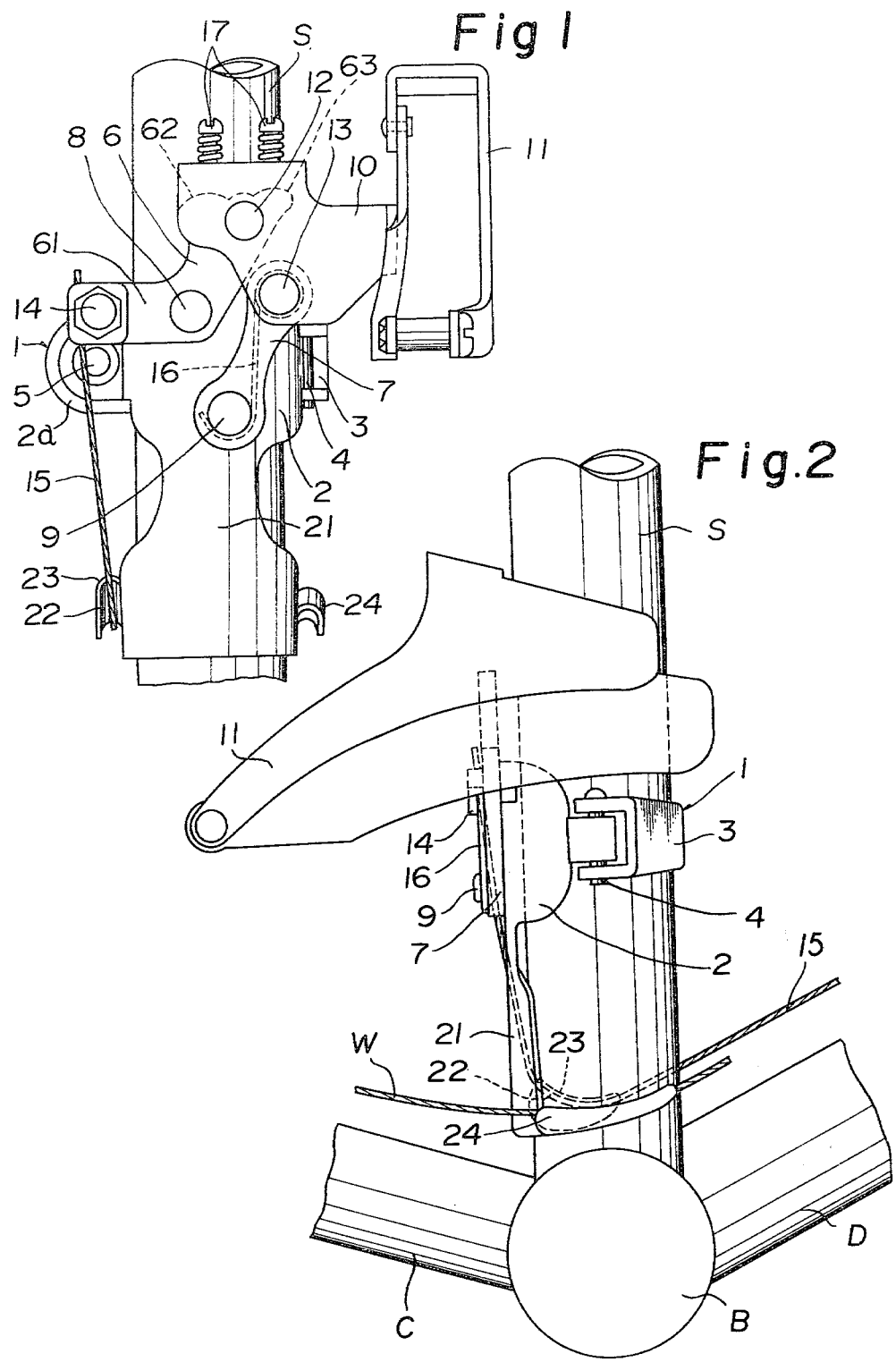

FRONT DERAILLEUR FOR A BICYCLE INCLUDING A WIRE GUIDE EXTENSION

BACKGROUND AND SUMMARY OF THE INVENTION

This invention relates to a front derailleur for a bicycle, and more particularly to improvements in a front derailleur comprising a fixing member fixed to the bicycle frame, two linkage members pivoted to the fixing member, and a movable member having a chain guide and supported to the linkage members, the derailleur being operated by a control wire to move the movable member with respect to the fixing member.

Generally, the control wire for operating the movable member at the front derailleur is accompanied by an outer sheath and is guided therewith. No wire guide is used for guiding the wire because the wire need not extend straight between the front derailleur and a control lever therefor.

In this instance, the outer sheath is required and is curved in a large radius between the lever and the derailleur to thereby reduce resistance against movement of the control wire when guided. As a result, the problem is raised in that the largely curved outer sheath can interfere with a cyclist.

In order to solve the above problem, a control wire having no outer sheath has been proposed, which extends along the bicycle frame. The wire, however, should extend straight along the bicycle frame requiring the provision of a wire guide at a joint of the bicycle frame, for example at the bottom bracket, because the wire is to be bent thereat.

When the sheathless control wire of the so-called bare-type, is used, the wire guide, which is separate from the derailleur, is fixed to the bicycle frame, resulting in an increase in the number of parts and labor for assembly.

Furthermore, a small thickness band is used for fixing the wire guide to the frame to reduce the cost of manufacture and weight. As a result, the band has a smaller tightening strength which allows the wire guide to move as the wire is controlled, thereby raising the problem of changes in wire length.

In order to overcome the aforesaid problems, this invention has been designed. An object of the invention is the provision of a front derailleur capable of guiding the control wire, even of the bare-typed, without using a separate wire guide.

This invention is characterized in that the fixing member at the front derailleur is utilized for mounting a wire guide integrally with the fixing member in such a manner that an extension is provided at the fixing member, the extension extending therefrom downwardly of the bicycle frame until the lowermost end of the extension is positioned in the vicinity of the bottom bracket at the bicycle, and having at the lower end portion the wire guide for guiding the control wire.

Hence, the wire guide can be set in position at the bicycle frame simultaneously when the fixing member of the front derailleur is fixed thereto, thereby enabling the guidance of control wire toward the control lever. As a result, the trouble of mounting a wire guide separate from the fixing member to the bicycle frame is eliminated.

These and other objects and novel features of the invention will be more apparent from the following description in accordance with the accompanying drawings.

BRIEF DESCRIPTION OF THE DRAWINGS

FIG. 1 is a front view of an embodiment of a front derailleur of the invention, and FIG. 2 is a right side view thereof.

DETAILED DESCRIPTION OF THE INVENTION

Referring to FIG. 1, the front derailleur of the invention is fixed to a seat tube S of the bicycle frame. The seat tube S, as shown in FIG. 2, is fixed at its lower end to a bottom bracket B. At the front side of the bottom bracket B is fixed a down tube D extending forward to be fixed to a head tube (not shown), and at the rear side, a chain stay C extending backward from the bottom bracket B and fixed to a seat stay (not shown).

Referring to FIGS. 1 and 2, reference numeral 1 designates a fixing member fixed to the seat tube S. The fixing member 1 comprises a first band 2 semicircular in section and having one fitting 2a, and a second band 3 semicircular in section and having one fitting (not shown). The bands 2 and 3 are pivotally connected by a pin 4 at each one end opposite to the fitting mounting end. The fittings at both the bands 2 and 3 are drawn and tightened by screw means 5 provided therebetween and the bands 2 and 3 are fixed to the seat tube S in an embracing manner.

In the drawings, reference numerals 6 and 7 designate a pair of first and second linkage members pivoted to the first band 2 at the fixing member 1 through a pair of pins 8 and 9, and 10 designates a movable member having a chain guide 11, the movable member being supported to the linkage members 6 and 7 through a pair of pins 12 and 13. The first linkage member 6 is extended at its one end pivoted by the pin 8 and forms an extension 61 to which a terminal of a control wire 15 is secured through a holder 14.

In addition, a return spring 16 is wound around the pin 13 and retained at one end to the movable member 10 and at the other end to the pin 9. Adjust screws 17 are provided at the movable member 10 and contact at the tips with stoppers 62 and 63 so that the movable member 10 is restricted in movement within a given range.

The above described construction is usual in the front derailleur of a link type and is not novel.

This invention is directed to improvements in the front derailleur constructed as just described. Referring to FIGS. 1 and 2, at the first band 2 is provided an extension 21 extending downwardly along the seat tube S. The lowermost end of extension 21 is kept slightly above the bottom bracket B and has a wire guide 22 integral with the extension 21 for guiding the control wire 15.

The extension 21 extends downward from between both ends of the first band 2 connected by the fitting 2a and pivot pin 4 respectively, and is larger in width than seat tube S and has a circular arc shape along the outer surface of seat tube S throughout its length in the extending direction. The lower end of extension 21 projects radially outwardly at one widthwise side thereof to form a projection 23 which is bent downward, thus forming a wire guide 22. The wire guide 22 is of an inverted U-like shape in section as shown in FIG. 1 and is oriented downward as shown by the dotted line in FIG. 2.

In addition, the extension 21 may be flat instead of having the shape of a circular arc. The wire guide 22 may be separate from the extension 21 and may be fixed integrally therewith by means of caulking or the like. The wire guide 22 also may, other than being formed in the inverted U-like shape in section, be formed in a C-like shape in section or a closed shape in section.

The front derailleur of the invention constructed as just described is used in such a manner that the control wire 15 is connected at its one end to the extension 61 of the linkage member 6 through the holder 14 and at the other end to the control lever (not shown) controlling the front derailleur by way of the wire guide 22, so that the lever is turned to operate the front derailleur.

The control wire 15 which is stretched across the front derailleur and control lever, is bent at the bottom bracket B, but is smoothly guided, changing its direction, by the wire guide 22 due to the fact that the wire guide 22, as shown in FIG. 2, is positioned at the lower end of extension 21 in the vicinity of the bottom bracket B, and is formed in a downward inverted U-like shape in section.

Furthermore, a conventional wire guide separate from the front derailleur is not required because the wire guide of the invention is integrated with the extension 21 of fixing member 1, resulting in a decrease in the number of parts and no trouble in assembly, thus making the product inexpensive.

In addition, the wire guide 22, which is provided at the lower end of extension 21 in the vicinity of the bottom bracket B, can guide the control wire 15 without any excessive force applied thereto.

As a modification of the just described embodiment, the extension 21, as shown in FIG. 1, may be provided at both widthwise sides with first and second wire guides 22 and 24, thereby guiding a control wire W for the rear derailleur as well as control wire 15 for the front derailleur. The rear derailleur is provided axially outwardly of the rear wheel, which is not shown but is well-known so as to be well understandable without any detailed description.

As clearly understood from the above description, the front derailleur of the invention is provided at the fixing member thereof with the extension extending close to the bottom bracket and at the lower end of the extension is provided the wire guide positioned in the vicinity of the bottom bracket. Hence, even when the bare-type wire is used, an extra wire guide is unnecessary and the wire can be smoothly guided.

Accordingly, by eliminating use of a separate wire guide the number of parts can be decreased and also only attachment of the fixing member to the seat tube is required to guide the control wire, resulting in a low cost to manufacture and less assembly operations.

While an embodiment of the invention has been shown and described, the invention is not limited to the specific construction thereof, which is merely exemplary. Rather, the invention is limited solely by the attached claims.

What is claimed is:

1. A front derailleur for a bicycle comprising a fixing member fixed to the upper portion of a bottom bracket at the bicycle frame, two linkage members pivoted to said fixing member, and a movable member pivoted to said linking members and carrying a chain guide, one of said linkage members and movable member having a holder for retaining the end of a first bare control wire, said movable member being movable with respect to said fixing member upon operation of said first control wire, an extension extending downward from said fixing member to the lower portion of said bicycle frame, said extension being positioned at the utmost end thereof near said bottom bracket and having at the utmost end a curved wire guide for bending and guiding said first control wire in a direction toward said holder.

2. A front derailleur according to claim 1, wherein said extension has at the utmost end thereof a first wire guide for guiding said first control wire and a second wire guide for guiding a second bare control wire for controlling a rear derailleur.

3. A front derailleur according to claim 1, wherein said fixing member comprises a pair of first and second bands semi-circular in section and each having one fitting, and said extension extends from said first band.

* * * * *